United States Patent [19]
Carter et al.

[11] Patent Number: 4,701,587
[45] Date of Patent: Oct. 20, 1987

[54] SHIELDED HEATING ELEMENT HAVING INTRINSIC TEMPERATURE CONTROL

[75] Inventors: Philip S. Carter, Palo Alto; John F. Krumme, Woodside, both of Calif.

[73] Assignee: Metcal, Inc., Menlo Park, Calif.

[21] Appl. No.: 243,777

[22] Filed: Mar. 16, 1981

Related U.S. Application Data

[63] Continuation-in-part of Ser. No. 71,682, Aug. 31, 1979, Pat. No. 4,256,945.

[51] Int. Cl.⁴ ............................................. H05B 5/00
[52] U.S. Cl. ............................... 219/10.75; 219/233; 219/241
[58] Field of Search ............... 219/10.41, 10.43, 10.49, 219/10.51, 10.75, 10.79, 229, 233, 241, 301; 128/1.3, 303.1, 303.13, 303.14; 30/40; 174/40 R, 126 CP, 106 R

[56] References Cited

U.S. PATENT DOCUMENTS

| | | | |
|---|---|---|---|
| 1,975,436 | 10/1934 | Sorrel et al. | 219/10.41 |
| 2,181,274 | 11/1939 | Jackson et al. | 219/10.79 |
| 2,513,778 | 7/1950 | Bailey | 219/10.41 |
| 3,218,384 | 11/1965 | Shaw | 338/214 X |
| 3,296,364 | 1/1967 | Mason | 174/106 R X |
| 3,515,837 | 6/1970 | Ando | 219/10.49 |
| 3,975,819 | 8/1976 | Ando | 29/611 |
| 4,017,344 | 4/1977 | Lorber et al. | 174/126 CP X |
| 4,079,192 | 3/1978 | Josse | 174/126 CP |
| 4,091,813 | 5/1978 | Shaw et al. | 128/303.14 |
| 4,256,945 | 3/1981 | Carter | 219/10.75 |
| 4,364,390 | 12/1982 | Shaw | 128/308.1 |

Primary Examiner—E. A. Goldberg
Assistant Examiner—Catherine M. Sigda
Attorney, Agent, or Firm—Hall, Myers & Rose

[57] ABSTRACT

A heating structure is described having both a return conductor and a heating element consisting of a substrate of a non-magnetic material having high thermal and electrical conductivity, clad with a surface layer of a ferromagnetic material of relatively low electrical conductivity.

15 Claims, 5 Drawing Figures

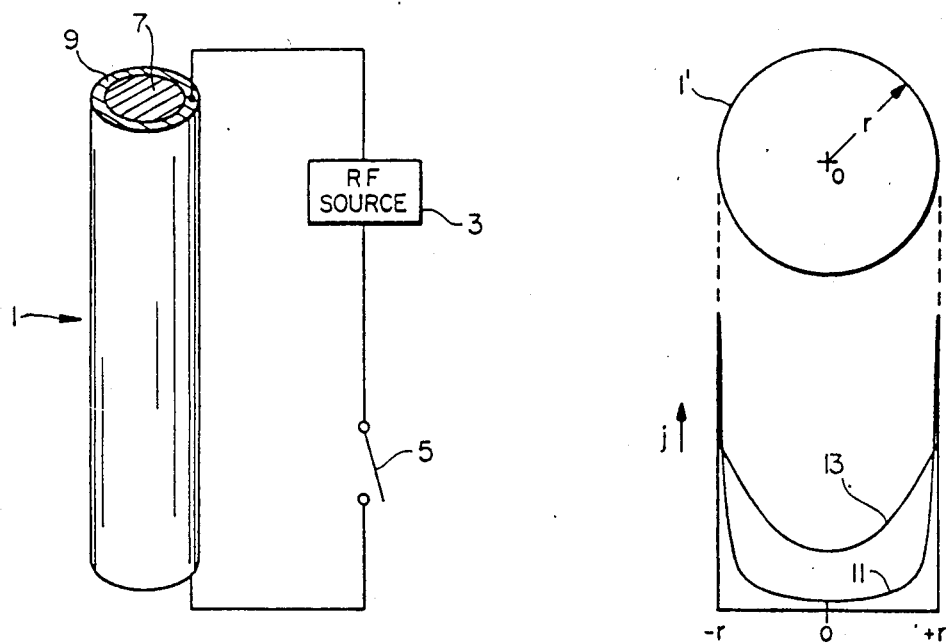
FIG__1
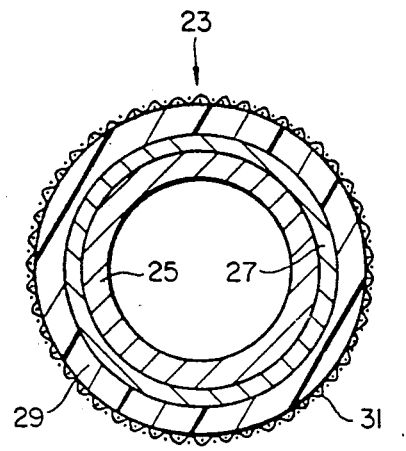
FIG__2
FIG__4
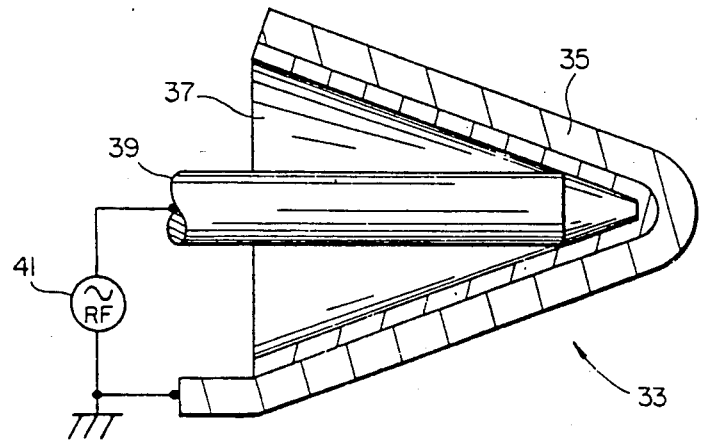
FIG__5

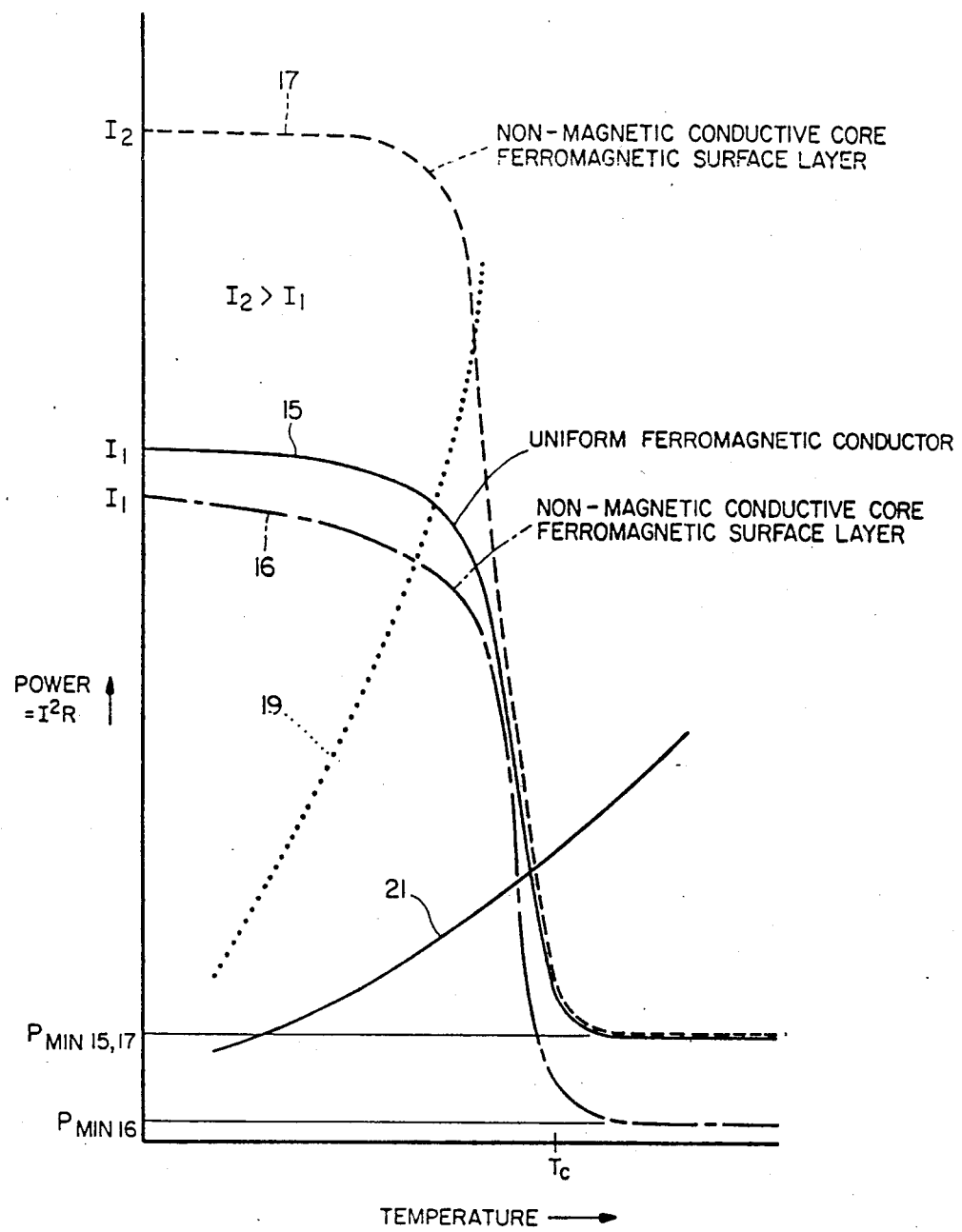
FIG_3

SHIELDED HEATING ELEMENT HAVING INTRINSIC TEMPERATURE CONTROL

CROSS-REFERENCE TO RELATED APPLICATION

This application is a continuation-in-part of patent application Ser. No. 071,682 filed Aug. 31, 1979 (now U.S. Pat. No. 4,256,945 issued Mar. 17, 1981) entitled ALTERNATING CURRENT ELECTRICALLY RESISTIVE HEATING ELEMENT HAVING INTRINSIC TEMPERATURE CONTROL.

BACKGROUND OF THE INVENTION

Thermally regulated heating elements of a wide variety of types have existed for some time. Most often these elements have utilized some form of feedback control system in which the temperature produced is sensed and the source of electrical energization to the heating element is controlled either in a continuous, proportional or step-wise switching fashion to achieve more-or-less constant temperature.

Our patent application Ser. No. 071,682 (now U.S. Pat. No. 4,256,945) describes and claims an electrically resistive heating element which is intrinsically self-regulating at a substantially constant temperature despite large changes in thermal load. Such heating element includes an electrically conductive, non-magnetic substrate member of high thermal and high electrically conductive material having over at least a portion of one of its surfaces, a generally thin layer of a magnetic material. The magnetic material is selected to have a maximum relative permeability greater than one below its Curie temperature, but a minimum relative permeability of substantially one above its Curie temperature. The result is that when the heating element is electrically coupled to a source of high frequency electric power, the heating element is heated by Joule heating with the current from such source being principally confined by the maximum permeability to the generally thin magnetic layer in accordance with the skin effect at temperatures below the Curie temperature of the magnetic layer, but spreading into the non-magnetic member as temperature rises to approach such Curie temperature and the relative permeability declines. This provides intrinsic autotemperature regulation about tne Curie temperature irrespective of localized variations and significant fluctuations in thermal load, without resort to complex feedback systems to control electrical energization.

As seen from the above, the element of our parent patent application requires the application thereto of an alternating current. There are, however, many uses of such a heating element which require that the heat dissipation area of the same, i.e., that surface area from which thermal energy is to be drawn, be electrically isolated from the electrical energy applied to the heating element to cause heating.

SUMMARY OF THE INVENTION

The present invention provides an electrically resistive heating element having both intrinsic temperature control and negligible electrical energy at the surface area from which heat is to be dissipated. It incorporates the structure of our earlier patent application and, hence, its features and advantages.

The heat dissipation area is isolated from the heating electrical energy by assuring that the substrate member of the heating element of our copending application has a thickness where the heat dissipation area is located, sufficient to substantially prevent electrical current at the surface covered with the thin layer of magnetic material from penetrating through the substrate to such heat dissipation area; by assuring that a return electrical conductor is included and positioned adjacent the substrate member with the generally thin layer of a magnetic material between the return conductor and the non-magnetic substrate; and by assuring that the return conductor is electrically connected to the remainder of the heating element adjacent a first bounding edge of the heat dissipation area and that the heating element is designed to be electrically coupled to a source of high frequency electric power adjacent another bounding edge of such heat dissipation area. The result of the combination of these structural features in such heating element is a shielding of the heat dissipation area from the high frequency electric current.

BRIEF DESCRIPTION OF THE DRAWINGS

FIG. 1 schematically represents a heating element according to our copending patent application;

FIG. 2 is a schematic representation of a cylindrical heating element and its current density profile;

FIG. 3 is a graph of power versus temperature illustrating the operational advantages of the heating element of our copending application;

FIG. 4 is a cross-sectional view of a fluid conduit incorporating the present invention; and FIG. 5 is a view partly in section and partly in elevation of a soldering iron tip employing the teachings of the present invention.

DETAILED DESCRIPTION OF A PREFERRED EMBODIMENT

A simplified cylindrical heating element 1 is shown in FIG. 1 connected in series with an R.F. source 3 and an on-off switch 5. R.F. source 3 provides high frequency alternating current power typically in the range from 8–20 MHz, and desirably includes constant current regulation.

Although the cylinders illustrated in FIGS. 1, 2 and 4 of this application are circular cylinders, it is to be understood that the use of the term "cylinder" in this application is by no means limited to the special case of circular cylinders. Furthermore, although the electrical circuit arrangements illustrated all employ direct or ohmmic connection to a source of alternating current electric power, it is to be understood that the invention is not so limited since the range of its application also includes those cases where the electric power source is electrically coupled to the heating element inductively or capacitively.

Heating element 1 is traversed along its major axis or length by a high frequency alternating current from R.F. source 3. The effect of this current is to cause $I^2R$ heating or "Joule" heating. If, as suggested above, R.F. source 3 is provided with constant current regulation, then $I^2$ is a constant and the power absorbed by heating element 1 from R.F. source 3 is proportional to the resistance R of element 1 between the points of connection to the external circuit.

As can also be seen in FIG. 1, heating element 1 has a composite structure in which an inner core or substrate 7, which might be made of copper or other non-magnetic, electrically and thermally conductive material is surrounded by or clad by a sheath or plating in the form of layer 9 which is made of a magnetic material such as a ferromagnetic alloy having a resistivity higher than the resistivity of the conductive material of core 7.

In FIG. 2, the current density profile across the cross-section of a conductor carrying high frequency current is illustrated. If the conductor is in the form of a circular cylindrical conductor of radius r, then the current density profile has the general form, under conditions of relatively high frequency excitation, illustrated by characteristic 11 in FIG. 2, showing a marked increase in current density in the surface regions of conductor 1'.

As will be apparent to those skilled in the art, characteristic 11 clearly illustrates the "skin effect" whereby alternating currents are concentrated more heavily in the surface regions of the conductor than in the interior volume thereof. The high concentration of current at the surface region of the conductor is more pronounced the higher the frequency is. However, from what follows it is also obvious that the skin effect is dependent upon the magnetic permeability of the conductor: In a "thick" conductor having a planar surface and a thickness T, energized by an alternating current source connected to produce a current parallel to the surface, the current density under the influence of the skin effect can be shown to be an exponentially decreasing function of the distance from the surface of the conductor:

$$j(x) = j_0 e^{-x/s},$$

where j (x) is the current density in amperes per sq. meter at a distance x in the conductor measured from the surface, $j_0$ is the current magnitude at the surface, and s is the "skin depth" which in mks units is given by $s = \sqrt{2/\mu\sigma\omega}$, for $T >> s$.

Where $\mu$ is the permeability of the material of conductor, $\sigma$ is the electrical conductivity of the material of the conductor and $\omega$ is the radian frequency of the alternating current source. In discussing the relationship of the skin effect to the magnetic properties of materials, it is convenient to talk in terms of the relative permeability $\mu_r$, where $\mu_r$ is the permeability normalized to $\mu_v$, the permeability of vacuum and $\mu_v = 4\pi \times 10^{-7}$ henry/meter. Thus, $$\mu_r = \frac{\mu}{\mu_v} = \frac{\mu}{4\pi \times 10^{-7}}.$$

For non-magnetic materials, $\mu_r \doteq 1$.

The foregoing relationship of current density as a function of distance from the surface, although derived for a thick planar conductor, also holds for circular cylindrical conductors having a radius of curvature much larger than the skin depth s.

Although it is not necessary to examine quantitatively the effects of these relationships, it is worth noting and understanding that for ferromagnetic alloys, which have values of $\mu_r$ in the range of 100 or more when operating below their Curie temperatures, the dependence of the above expressions upon $\mu$ results in a markedly steeper drop of current away from the surface of a ferromagnetic conductor as compared to a non-magnetic conductor, for which $\mu_r = 1$.

As temperature approaches the Curie temperature of a ferromagnetic conductor, however, the relative permeability declines quite rapidly and approaches a value very near 1 for temperatures above the Curie temperature. The corresponding effect on the current density profile of a purely magnetic cylindrical conductor 1' of radius r is illustrated by FIG. 2.

The lower part of FIG. 2 is a graph of current density j across the diameter of conductor 1'. For temperatures well below the Curie temperature, current density profile 11 shows the expected high current density at the surface of conductor 1' tapering rapidly to a very low current in the interior of conductor 1'. Profile 13, on the other hand, illustrates the current density for a temperature in the region of the Curie temperature of the ferromagnetic material of conductor 1': the characteristic shows a considerable lessening of the skin effect with only a moderate falling off of current away from the surfaces of conductor 1'.

Qualitatively, these effects are entirely comprehensible from the foregoing material concerning the marked decline of $\mu$ as temperature rises to near the Curie temperature of a ferromagnetic material: since $\mu_r$ for a magnetic material approaches 1 near the Curie temperature, the current density profile approaches the shape of the current density profile for a non-magnetic conductor.

Turning now to FIG. 3, a graph of power versus temperature for two different heating elements is shown. Characteristic 15 is for a uniform ferromagnetic conductor such as, for example, the conductor 1' shown in FIG. 2, carrying a constant current $I_1$. As shown, characteristic 15 exhibits a sharp drop in power absorbed from an R.F. energizing source such as R.F. source 3 in FIG. 1, as the Curie temperature $T_c$ is approached. Following this sharp drop in power, characteristic 15 levels off at a level labeled $P_{min}$ in FIG. 3.

Characteristic 16 in FIG. 3 shows a typical power versus temperature curve for a composite heating element such as element 1 in FIG. 1 in which a non-magnetic conductive core is surrounded by a ferromagnetic surface layer. Characteristic 16 also illustrates the very similar behavior of a hollow, cylindrical non-magnetic conductor which has been provided with a ferromagnetic layer on its inside surface, or indeed any composite conductor formed principally of a non-magnetic conductive member with a ferromagnetic surface layer according to the present invention. Although qualitatively the shape of characteristic 16 is similar to that for characteristic 15, it is to be noted that characteristic 16 descends more nearly vertically to a lower value of minimum power input.

A third characteristic 17 illustrates the effect of increasing the current carried by the composite heating element to a new value $I_2$ which is greater than $I_1$. As illustrated, characteristic 17 shows the effect of such a current increase where $I_2$ has been selected so as to produce the same level of minimum power $P_{min}$ as was obtained in the case of the characteristic for a uniform ferromagnetic conductor 15 operating at current $I_1$.

The significance of such a current increase can be appreciated by considering the pair of thermal load lines 19 and 21. Load lines 19 and 21 are graphs of total power lost through conduction, convection, and radiation, shown as a function of temperature. As will be apparent to those skilled in the art, load line 19 is for a condition of greater thermal lossiness than load line 21. For example, line 19 might represent the thermal load when a fluid coolant is brought into contact with the heating element.

Since at thermal equilibrium the power input to a heating element equals the power lost by radiation, convection, and conduction, resulting in a steady temperature, the points of intersection of lines 19 and 21 with the chracteristics 15, 16 and 17 represent equilibria from which both the steady state power input and temperature can be read.

By considering the six intersections of lines 19 and 21 with characteristics 15–17, the following facts may be deduced: (1) good temperature regulation despite variations in thermal load requires that the points of intersection for all thermal loads to be encountered in use should lie, insofar as possible, on the nearly vertical portion of the characteristic line; (2) the ideal characteristic line would have a long, straight vertical section such that widely varying thermal loads could be accommodated without any variation in temperature; (3) characteristic line 17 in FIG. 3 which is representative of heating elements having a composite structure with a non-magnetic conductive core and a ferromagnetic surface layer, operating at the relatively higher current $I_2$, most nearly approaches the ideal since both thermal load lines 19 and 21 intersect characteristic 17 defining equilibria which lie on the long, straight, nearly vertically falling portion of characteristic 17.

The reason for the superior temperature regulating performance of the composite heating element as shown by characteristics 16 and 17 of FIG. 3 is relatively simple to understand in a qualitative way.

Since both current and frequency are constants, the power input to the heating element ($P=I^2R$) is directly proportional to the resistance of the heating element as a function of temperature, R(T). As temperature rises and approaches the Curie temperature of the ferromagnetic material concerned, magnetic permeability $\mu$ drops to approach the permeability of vacuum ($\mu_r=1$) as a limit beyond the Curie temperature, $T_c$. The consequent significant reduction in skin effect causes current, which flowed almost entirely in the surface layer of the heating element at low temperatures, to migrate or spread into the body of the heating element such that more and more current flows through the interior as temperature rises near $T_c$. Since the available cross-section for current flow is thus increased and since most of the current is flowing in a highly conductive medium, resistance drops causing a corresponding drop in power consumption.

In the case of the composite heating element according to the present invention, only a relatively thin surface layer of the heating element is formed of ferromagnetic material, while the remainder consists of a substrate member made of non-magnetic material having high electrical conductivity. Consequently, the decline in resistance and power consumption which is experienced with a purely ferromagnetic heating element is greatly increased by the use of a non-magnetic, highly conductive core.

As already noted, when current is held constant, power is proportional to the resistance of the heating element. Consequently, the maximum power and the minimum power which will be supplied to the heating element are proportional to the maximum and minimum resistance of the heating element. Since the ratio of maximum power to minimum power determines the range over which the heating element can adequately maintain constant temperature, this ratio and the corresponding ratio, $R_{max}/R_{min}$, are significant indicia of performance. It can be shown that $$\frac{R_{max}}{R_{min}} = \sqrt{\frac{\mu_{rmax}\,\sigma_{min}}{\mu_{rmin}\,\sigma_{max}}},$$

and $\sigma$ represent the permeability and conductivity of the material as before.

For ferromagnetic materials, the ratio $\sigma_{min}/\sigma_{max}$ is sufficiently close to 1 such that to a good approximation, $$\frac{R_{max}}{R_{min}} = \sqrt{\frac{\mu_{rmax}}{\mu_{rmin}}}.$$

Since $\mu_{r\,max}$ has values which fall in the range from 100–600 for commercially available magnetic materials, and further since $\mu_r$ min (the value above $T_c$) is approximately equal to 1, the ratio $R_{max}/R_{min}$ has a range of values for ferromagnetic materials from approximately $\sqrt{100}$ to $\sqrt{600}$, or approximately 10 to 25.

By the use of the composite construction according to the present invention, this modest ratio of resistances can be vastly increased by selection of the relative cross-sectional areas and conductivities of the non-magnetic member and its ferromagnetic surface layer. Through the choice of the Curie temperature by means of alternative ferromagnetic materials, the temperature at which regulation will take place is also variable.

Turning now to FIG. 4, there is shown a novel application of the present invention to form a heated conduit for the transmission of fluid such as, for example, crude oil over long distances while maintaining the fluid at a selected elevated temperature designed to minimize viscosity. The conduit 23 of FIG. 4 comprises a hollow cylindrical core 25 which may be made of copper or a less expensive non-magnetic material, for example. Surrounding and immediately adjacent and in contact with the surface of core 25 is a ferromagnetic layer 27 which is in good thermal and electrical contact with core 25 substantially throughout its length.

An insulative layer 29 surrounds core 25 and layer 27, electrically and thermally separating them from an outer electrically conductive sheath 31 which might be a woven mesh of fine copper wires, encompassing the heating element made up of the core 25 and the layer 27. A source of R.F. current to energize conduit 23 is connectable between sheath 31 and the heating element consisting of core 25 and layer 27. Typically, sheath 31 is operated at ground potential.

In accordance with the present invention, the core 25 is provided with a thickness between its heat dissipation area (its entire inner surface) and the layer 27 which is sufficient to prevent any significant electrical current applied between the sheet 31 and the heating element from penetrating through the core 25 to its inner surface. Most desirably, such thickness is at least about 5 skin depths thick.

It is important to note that in the configuration of FIG. 4, the layer 27 is positioned between the sheath 31 and the core 25. This physical relationship will assure that current caused by the electrical coupling of a source of high frequency electrical power between the sheath 31 and the heating element made up of the core 25 and layer 27, will be confined to the magnetic layer in accordance with the skin effect at temperatures below the Curie temperature of the magnetic layer, spread into the core 25 as temperature rises to approach such Curie temperature. However, the thickness of the core 25 will inhibit the flow of such current to its inner surface. And the electric and magnetic field which accompany such current will be confined between the sheath 31 and the thin layer 27. (The relationship of the sheath 31 and the thin layer provides in this sense structure analysis to a transmission line.)

It should be noted that it is contemplated that the source of high frequency power be applied between the sheath 31 and the heating element at one end of the conduit, and that the sheath and heating element will be electrically connected together at the opposite end. The result is that the sheath is connected to the heating element adjacent a first bounding edge of the heat dissipation area (the inner surface of the core 25) whereas the power source is connected to the heating element adjacent another bounding edge of such area.

It should also be noted that although the sheath is referred to as a "return" electrical conductor, this is not to imply any particular direction of current flow nor the voltage applied to such sheaths. In this connection, while it is preferred that the sheath be at ground to reduce the hazard of electrical shock as previously mentioned, it is contemplated from the broad standpoint that it could be at any potential not inconsistent with the application of high frequency power between the same and the heating element.

It should also be noted that the electrical shielding is achieved while the good thermal contact required for thermal conductivity is maintained. In other words, the heating structure of the invention retains the high thermal conductivity inherent in the materials used while isolating the heat dissipation area from the high frequency current provided by the power source.

In FIG. 5 is shown an additional application of the present invention to a soldering iron structure 33. Such structure includes a soldering tip comprised of an outer electrically conductive non-magnetic heating substrate member 35 which is shaped generally conically. It is copper, for example, and is in good thermal and electrical contact with an inner ferromagnetic shell 37, thus forming a composite self-regulating heating element in accordance with the present invention. An inner conductive, non-magnetic return conductor stem 39 extends axially into conical shells 35 and 37 and is electrically joined to inner shell 37 as by spot welding, for example, adjacent the apex portion of the tip. Thus, the return stem 39 is circumscribed by the soldering tip. An R.F. source 41 is shown schematically interconnected between stem 39 and shown schematically interconnected between stem 39 and outer shell 35.

A soldering iron tip makes particularly good use of the advantages of the composite heating element and shielded structure of the present invention. As will be obvious to those skilled in the art, the path of current flow through the structure of tip 33 is along return stem 39 to its point of juncture with inner shell 37 and axially along the conical inside surface of the tip in an expanding current flow path. Were it not for the composite heating element structure of the soldering iron, such a current flow path would inevitably produce excessive absorption of electric power at the apex portion of the soldering iron tip, since the cross-section of the current flow path is smallest at this point and the resistance would in the usual case be higher therefore. The result would be that unless large amounts of copper were used in the formation of outer shell 35, the apex region of the tip would be overheated while portions near the broad base of the cone received inadequate heat. However, such overheating of the apex region of the tip does not occur since at each axial cross-section of the current flow path the local dissipation of R.F. energy is governed by the thermal characteristics detailed in FIG. 3 of this application. Consequently, each portion of the current flow path will adjust its temperature to very nearly the desired regulated value despite significant changes in current-path cross-sectional area, or differential thermal loading.

In accordance with the instant invention, shell 35 is provided with a thickness between its exterior surface and the inner shell 37, sufficient to prevent any significant electrical current from penetrating to such exterior surface. In this connection, the skin depth in a highly conductive material such as copper which would typically be used for the shell 35, is in the order of 1/1000 of an inch at typical operating frequencies of, for example, 10 MHz. If the thickness of the shell were 10/1000 of an inch (a thickness equal to about 10 skin depths) the current at the outer surface would be less than the current on the inner surface by a factor of $e^{10}$ (22,026). The electromagnetic field would be correspondingly reduced below its magnitude at the inner surface. Thus the thermally hot outer surface is essentially completely shielded, from the electrical standpoint, and can be used for soldering and other operations where the item being heated cannot safely be exposed to an electromagnetic field.

It should be noted that the inner shell 37 (the layer of ferromagnetic material) is physically positioned between the stem 39 and the substrate shell 35. However, whereas in FIG. 4 the return conductor, the sheath 31, is at the exterior of the heating structure, in this embodiment the return conductor, the stem 39, is on the interior. Moreover, it is the shell 35 in this embodiment which is connected to a ground lead of the source 41, rather than the return conductor. Such source most desirably operates in a frequency range between about 8 and 20 MHz.

Although the invention has been described with some particularity in reference to a set of preferred embodiments which, taken together, comprise the best mode contemplated by the inventors for carrying out their invention, it will be obvious to those skilled in the art that many changes could be made and many apparently alternative embodiments thus derived without departing from the scope of the invention. Consequently, it is intended that the scope of the invention be interpreted only from the following claims.

We claim:

1. A soldering iron structure comprising:
A. An alternating-current electricity resistive soldering tip having:
   (1) a generally conically shaped, electrically conductive non-magnetic heating substrate member having a heat dissipation area for soldering on an exposed, generally conical surface spaced apart from an inner surface, which member is of a high thermal and high electrically conductive material having a thickness at said heat dissipation area sufficient to substantially prevent electrical current at said inner surface from penetrating through said substrate to said heat dissipation area of said exposed surface;
   (2) a generally thin layer of a magnetic material covering and in good thermal and electrically conductive contact with said inner surface of said substrate which material has a maximum relative permeability greater than 1 below its Curie temperature and a minimum relative permeability of substantially 1 above its Curie temperature; and B. an electrically conductive return stem positioned interiorly of said tip and electrically connected to an inner-most surface of said magnetic layer adjacent a first bounding edge of said heat dissipation area of said exposed surface; whereby when a source of high frequency power is electrically coupled between said stem and said tip adjacent another bounding edge of said heat dissipation area, said current is principally confined by the physical relationship of said stem to said tip to said thin magnetic layer in accordance with the skin effect at temperatures below the Curie temperature of said magnetic layer, and spreads into said non-magnetic layer as temperature rises to approach said Curie temperature and its relative permeability declines, but the thickness of said non-magnetic substrate inhibits the flow of said current to said heat dissipation area of said exposed surface of said substrate.

2. A soldering iron structure according to claim 1 wherein said non-magnetic substrate member has a thickness between said heat dissipation area and inner surface at least equal to about 5 skin depths.

3. A soldering iron structure according to claim 1 wherein a source of high frequency power is electrically coupled between said stem and said heating substrate member adjacent another bounding edge of said heat dissipation area, with said heating member connected to a grounded lead of said source.

4. A soldering iron structure according to claim 3 wherein said source of high frequency power operates in a frequency range between about 8 and 20 MHz.

5. A soldering iron structure according to claim 1 wherein said return stem is circumscribed adjacent said heat dissipation area, by said soldering tip.

6. A heating structure comprising
an electrically and thermally conductive member having first and second surfaces,
a ferromagentic member having first and second surfaces with a first surface thermally and electrically coupled to said first surface of said conductive member, and
means for connecting said members in parallel across an alternating current source with a return conductor of the source disposed adjacent said second surface of said ferromagentic member,
means for substantially preventing electrical current from flowing along the second surface of said conductive member whereby to shield regions adjacent said heating structure from electromagnetic radiation,
said means for substantially preventing comprising a thickness of said conductive member equal to several skin depths, at the resistance of the conductive member and the frequency of a source employed with the heating structure when said ferromagentic material has been heated sufficiently to become essentially paramagnetic,
the source supplying sufficient energy to heat said ferromagnetic member to its Curie temperature to provide thereby autoregulation of the temperature generated by said heating structure.

7. A heating structure according to claim 6 with the thickness of said conductive member being at least 5 skin depths at the frequency of the source and with the mu of such ferromagnetic member approaching that of said conductive layer.

8. A heating structure according to claim 7 wherein the source provides a relatively constant current to said member.

9. A heating structure comprising:
A. An alternating-current electrically resistive heating element having:
(1) an electrically conductive substrate member of high thermal and relatively high electrically conductive material having a pair of surfaces, a first one of said surfaces having a heat dissipation area spaced apart from the other of said surfaces by a thickness of said material sufficient to substantially prevent electrical current supplied at said other surface by a source of high frequency electrical power, from penetrating through said substrate to said heat dissipation area;
(2) a generally thin layer of a magnetic material covering and in good thermal and electrically conductive contact with said other surface of said substrate member, which material has a maximum relative permeability greater than 1 below its Curie temperature and a minimum relative permeability of substantially 1 above its Curie temperature; and
B. a current return path extending from a first bounding edge of the heat dissipation area of said one surface of said heating element with said generally thin layer of said magnetic material located between said return path and said non-magnetic substrate;
whereby when a source of high frequency electric power is electrically coupled between said return path and said heating element adjacent another bounding edge of said heat dissipation area, said current is principally confined by said physical relationship to said thin magnetic layer in accordance with the skin effect at temperatures below the Curie temperature of said magnetic layer, and spreads into said non-magnetic member as temperature rises to approach said Curie temperature and its relative permeability declines, and the thickness of said non-magnetic substrate inhibits the flow of current to said heat dissipation area of said first surface of said substrate member.

10. A heater structure comprising:
A. an alternating-current electrically resistive element having:
(1) an electrically conductive non-magnetic substrate member having a heat dissipation area, which member is of a high thermal and high electrically conductive material having a thickness at said heat dissipation area sufficient to substantially prevent electrical current at said inner surface from penetrating through said substrate to said heat dissipation area of said exposed surface;
(2) a generally thin layer of a magnetic material covering and in good thermal and electrically conductive contact with said inner surface of said substrate which material has a maximum relative permeability greater than 1 below its Curie temperature and a minimum relative permeability of substantially 1 above its Curie temperature; and
B. an electrically conductive return member positioned interiorly of said thin layer and electrically connected to an innermost surface of said magnetic layer adjacent a first bounding edge of said heat dissipation area of said exposed surface; whereby when a source of high frequency power is electrically coupled between said member and said element adjacent another bounding edge of said heat dissipation area, said current is principally confined by the physical relationship of said member to said heat dissipation area to said thin magnetic layer in accordance with the skin effect at temperatures below the Curie temperature of said magnetic layer, and spreads into said non-magnetic layer as temperature rises to approach said Curie temperature and its relative permeability declines, but the thickness of said non-magnetic substrate inhibits the flow of said current to said heat dissipation area of said exposed surface of said substrate.

11. A structure according to claim 1 wherein a source of high frequency power is electrically coupled between said stem and said heating substrate member adjacent another bounding edge of said heat dissipation area, with said heating substrate member connected to a grounded lead of said source.

12. A structure according to claim 3 wherein said source of high frequency power operates in a frequency range between about 8 and 20 MHz.

13. A structure according to claim 1 wherein said return member is circumscribed adjacent said heat dissipation area by said first bounding edge.

14. A heating structure comprising
an electrically and thermally conductive member having first and second surfaces,
a ferromagentic member having first and second surfaces with a first surface thermally and electrically coupled to said first surface of said conductive member, and
means for connecting said members in parallel across an alternating current source with a return conductor of the source disposed adjacent said second surface of said ferromagnetic member,
means for substantially preventing electrical current from flowing along the second surface of said conductive member whereby to shield regions adjacent said heating structure from electromagnetic radiation;
said means for substantially preventing comprising a thickness of said conductive member equal to several skin depths as defined by $$S.D. = 5030 \sqrt{\frac{\rho}{f}}$$

at a heater structure temperature where the ferromagnetic member has become substantially paramagnetic where $\rho$+the resistivity of the conductive member and $f$ is the frequency of the source with which the heater structure is to be employed, the source supplying sufficient energy to heat said ferromagnetic member to its Curie temperature to provide thereby autoregulation of the temperature generated by said heating structure.

15. A heater structure according to claim 6 wherein the thickness of said conductive member is at least approximately 5 skin depths.

* * * * *